United States Patent [19]

Oudenhuysen et al.

[11] Patent Number: 4,789,977
[45] Date of Patent: Dec. 6, 1988

[54] OPTICAL DATA RECORDING DEVICE

[75] Inventors: Adrianus H. Oudenhuysen, Colorado Springs, Colo.; Wai-Hon Lee, Cupertino, Calif.

[73] Assignee: Laser Magnetic Storage International Company, Colorado Springs, Colo.

[21] Appl. No.: 927,924

[22] Filed: Nov. 6, 1986

[51] Int. Cl.$^4$ .......................... G11B 7/135; G02B 5/32
[52] U.S. Cl. .................................. 369/109; 369/112; 350/3.72
[58] Field of Search ............ 369/44, 45, 46, 112, 369/120, 121, 122, 109, 111; 250/201 DF; 350/96.11–96.14, 3.72, 162.17, 162.19

[56] References Cited

U.S. PATENT DOCUMENTS

| | | | |
|---|---|---|---|
| 4,306,763 | 12/1981 | Huingard | 350/3.72 |
| 4,358,200 | 11/1982 | Heemskerk et al. | 356/123 |
| 4,458,980 | 7/1984 | Ohki et al. | 369/112 |
| 4,497,534 | 2/1985 | Sincerbox | 350/3.72 |
| 4,542,492 | 9/1985 | Leterme et al. | 369/45 |
| 4,624,526 | 11/1986 | Tsukai et al. | 369/109 |
| 4,641,296 | 2/1987 | Mizunoe et al. | 369/45 |

FOREIGN PATENT DOCUMENTS

| | | |
|---|---|---|
| 0059084 | 9/1982 | European Pat. Off. . |
| 0195657 | 9/1986 | European Pat. Off. . |

*Primary Examiner*—Donald McElheny, Jr.
*Attorney, Agent, or Firm*—Sheridan, Ross & McIntosh

[57] ABSTRACT

An optical data recording device for focusing a laser beam on a recording medium for storing and reading out information therefrom. The device is characterized by using a high efficiency holographic grating as a polarization beam splitter. In a forward collimated light path the holographic grating diffracts a light beam from a laser on an objective lens. The beam is reflected from the surface towards the recording medium and transmitted through the grating onto a light detector. The grating further provides for correcting a typical elliptical light beam shape from the laser to a circular beam shape as well as for correcting the astigmatism typically found in the wave fronts emitting from a laser diode.

8 Claims, 3 Drawing Sheets

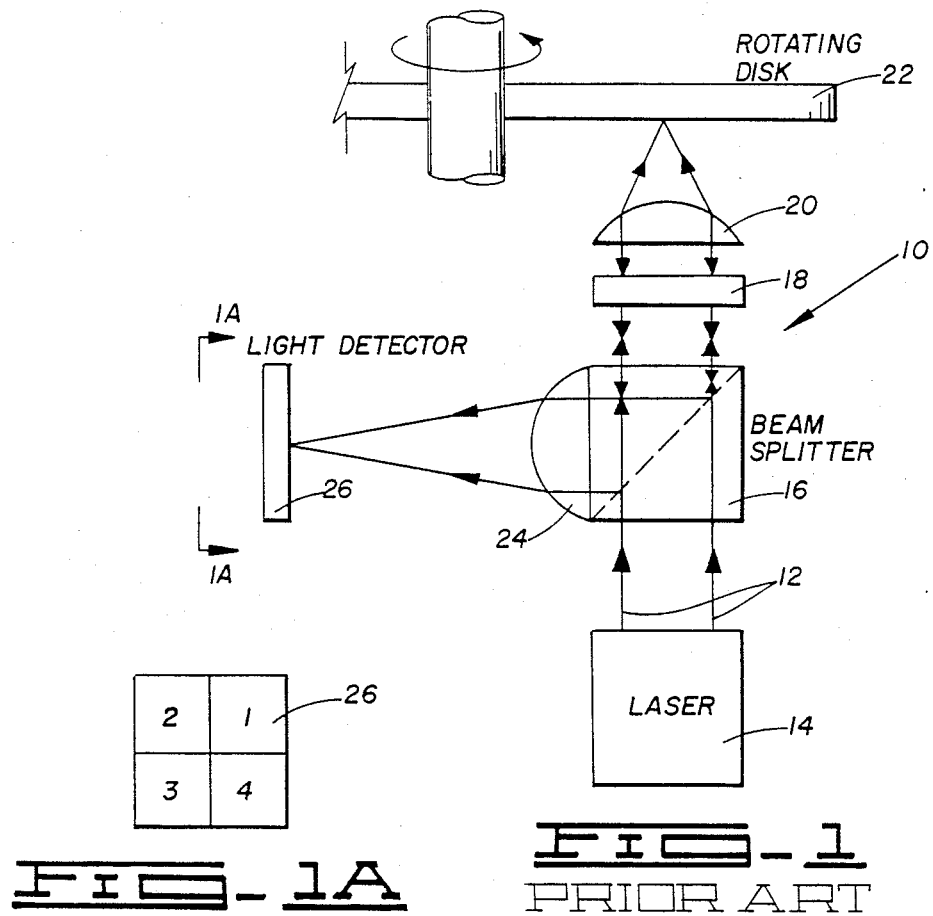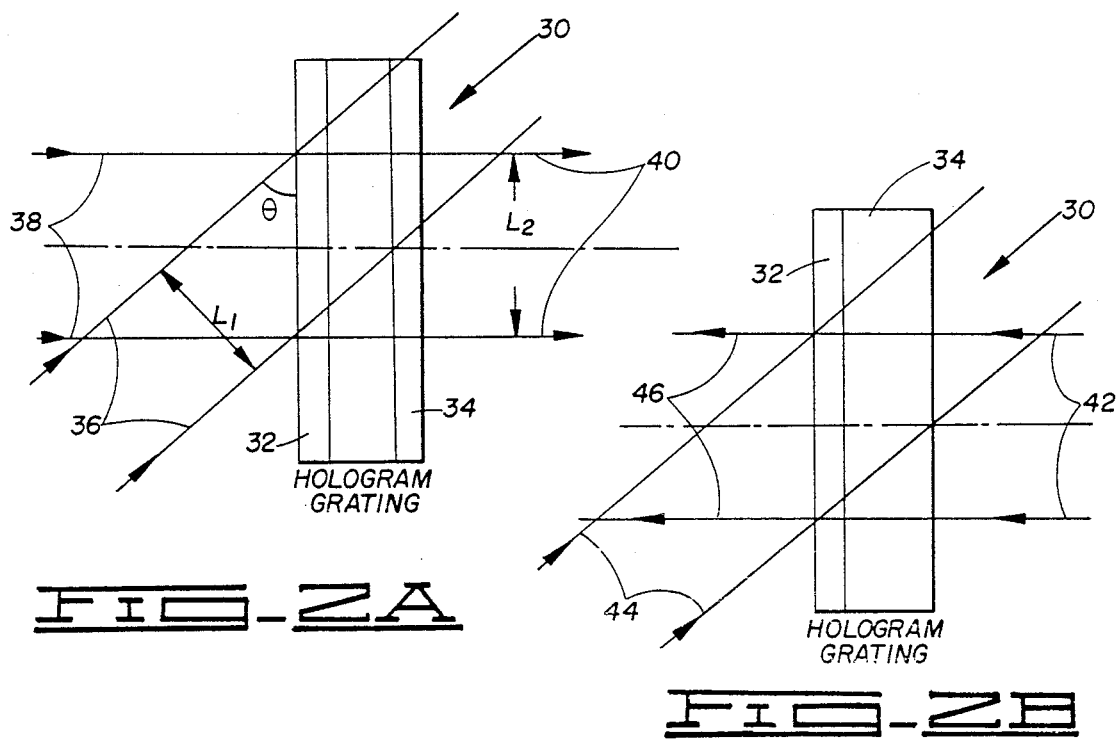

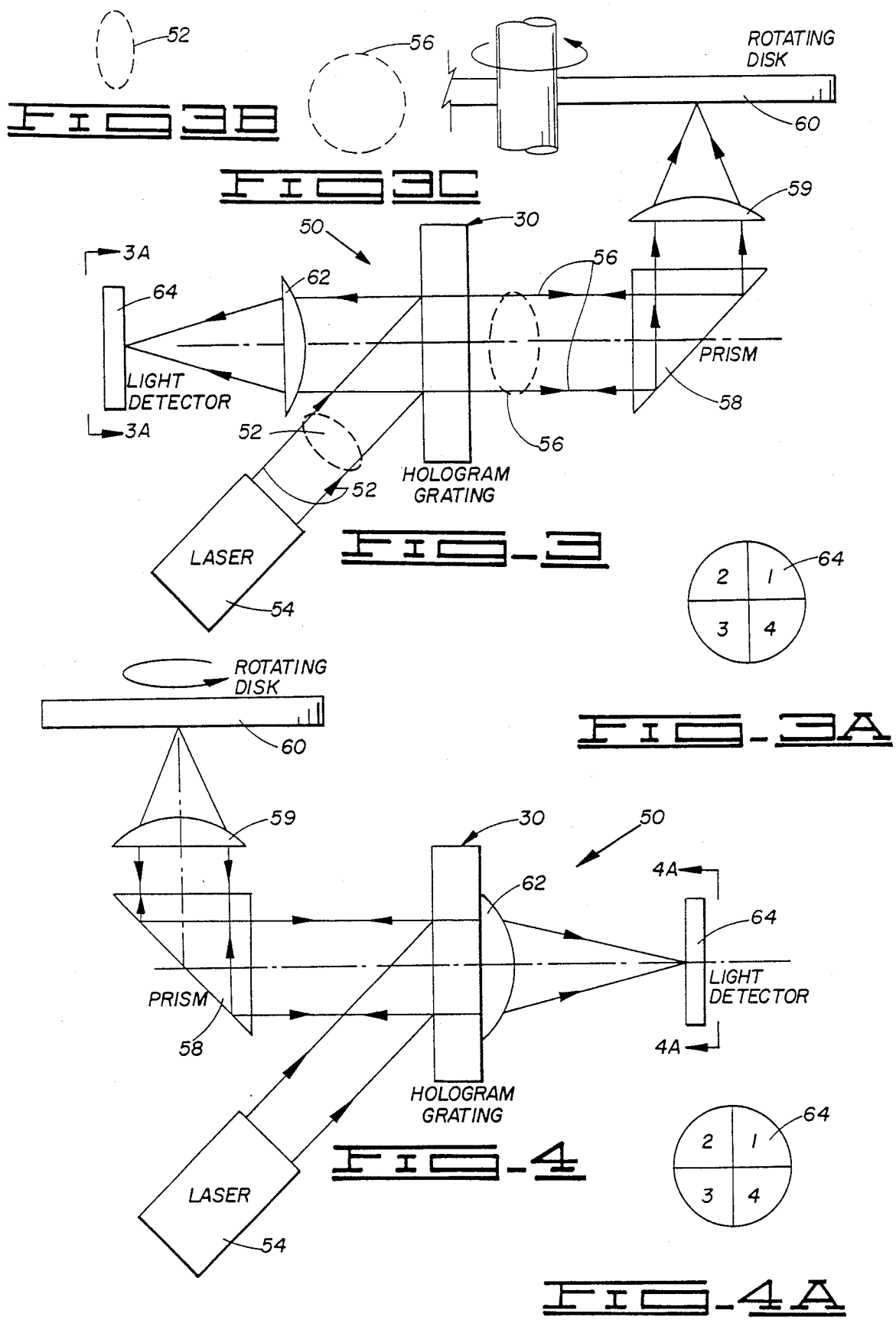

OPTICAL DATA RECORDING DEVICE

BACKGROUND

1. Field of the Invention

This invention relates to optical data recording devices utilizing rotating disc recording media, and more particularly but not by way of limitation, to a recording device having a holographic grating for beam splitting a laser light source.

2. Brief Description of the Prior Art

Heretofore, in many optical storage devices a polarized beam splitter is used as an optical switch. The splitter passes all of the light from a laser light source to a recording medium, and at the same time it isolates the reflected beam from the medium to prevent the light from returning to the laser. This phenomenon is based on the principle that a specially coated beam splitter can reflect most of the light which is polarized perpendicular to its plane of incidence and transmit all the light polarized in its plane of incidence. The use of polarized beam splitters with quarter wave retardation plates is expensive.

In U.S. Pat. Nos. 4,542,492, 4,513,408, 4,489,408, 3,422,273, 4,025,949, 3,978,278 and 3,924,063, various types of optical storage devices are described. None of these prior art patents specifically describes or uses a holographic grating for transmitting and reflecting a laser light source used in optical recording.

SUMMARY OF THE INVENTION

The present invention eliminates the need of expensive polarized beam splitters and quarter wave retardation plates, thereby greatly reducing the overall cost of components used in optical data recording.

The invention uses an inexpensive holographic grating as a polarization beam splitter. Further, the holographic grating has the inherent features of creating a circular beam shape from a typical elliptical beam shape transmitted from the laser light source. This greatly reduces the spot size of the focused beam on the recording medium.

The optical data recording device of the present invention comprises a laser light source for transmitting a collimated light beam onto a holographic grating which diffracts the light beam from the laser onto an objective lens. The light is then focused onto a recording medium and reflected back through the lens and transmitted through the grating onto a light detector for analysis.

The advantages and objects of the invention will become evident from the following detailed description of the drawings when read in connection with the accompanying drawings which illustrate preferred embodiments of the invention.

BRIEF DESCRIPTION OF THE DRAWINGS

FIG. 1 depicts a prior art optical data recording device. FIG. 1A illustrates a typical quad diode having four zones on a light detector.

FIG. 2A and FIG. 2B illustrate a holographic grating for transmission and reflection of a light source.

FIGS. 3, 3A, 3B and 3C illustrate an embodiment of the present invention using a holographic grating with an optical recording device.

FIGS. 4 and 4A illustrate another embodiment of the present invention.

DETAILED DESCRIPTION OF THE INVENTION

Figure 5A:
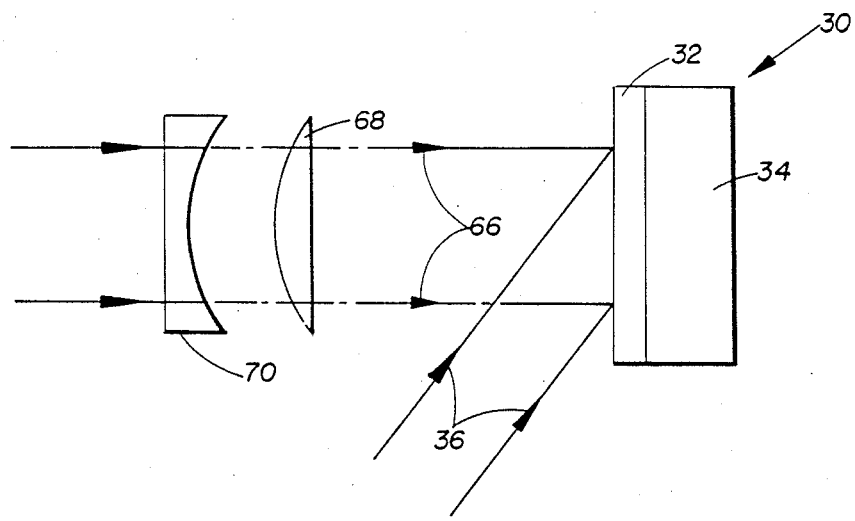
FIGS. 5A and 5B illustrate an incorporation of a wave front from a cylindrical lens onto a holographic grating.

Like numerals and characters designate like elements throughout the figures of the drawings.

In FIG. 1 a prior art optical storage device 10 is represented having a collimated beam of light indicated by arrows 12 produced from a laser 14. The light 12 is polarized on a plane of incidence of a beam splitter 16. The light 12 is fully transmitted in this example by the beam splitter 16. The polarization of the light 12 is such that the beam splitter 16 transmits all of its power through a quarter wave retardation plate 18 and through an objective lens 20 where it is focused onto a recording medium such as a rotating optical disk 22. Upon reflection of the light from the rotating disk 22, the return light is polarized at 90 degrees from the original polarization of the laser 14. Accordingly, it is reflected by the beam splitter 16 through a toric lens 24 onto a light detector 26. Little of the return light is transmitted back to the laser source 14. FIG. 1A depicts a typical light detector having quad like zones 1, 2, 3 and 4.

FIG. 2A illustrates the general principle of making a high efficiency holographic grating having general reference numeral 30. The grating 30 includes a light sensitive layer 32 and substrate 34. The layer 32 and substrate 34 making up the holographic grating 30 are greatly enlarged in this drawing for illustration only. Two collimated beams of light 36 and 38 interfere onto the light sensitive layer 32 which is supported the substrate 34. Both beams are polarized perpendicular to the plane of incidence of the holographic grating 30. The holographic grating 30 made in this configuration is a transmission holographic grating because upon illuminating the hologram grating by a beam similar to the beam 36 a beam 40 appears as a continuation of the beam 38 as reconstructed. The light sensitive layer 32 can be a photosensitive polymer or dichromated gelatin. The thickness of the layer 32 must be many times the wave length of the light used with the recording device 10.

The relationship between thickness and optical efficiency of the grating 30 can be found as described in an article entitled, "Coupled Wave Theory for Thick Holographic Grating", by H. Kogelnik, published in the Bell System Technical Journal, Vol. 48, No. 9, page 2909 through 2946, 1969. In this article the author also discusses that the diffraction efficiency is sensitive to the polarization of the illuminating beam in the reconstruction process. The teaching of the Kogelnik article is incorporated herein by reference insofar as may be required for an understanding of the present invention.

In FIG. 2A the width of the beam 36 is $L_1$ and the beam width of the constructed beam 40 is $L_2$. The relationship between the two widths is $L_2 = L_1/\sin\theta$. For example, if the angle $\theta$ as shown in FIG. 2A is 30 degrees, the width $L_2$ of the reconstructed beam is equal to $2L_1$. Hence the incident beam is expanded along one direction by a factor of 2.

FIG. 2B is another illustration of the reflection hologram grating 30 similar to that described for FIG. 2A, two collimated beams of light 42 and 44 now coming from opposite directions interfere on the light sensitive layer 32. Upon illuminating the hologram 30 with the beam 44, a beam 46 is reflected from the hologram grating 30.

FIGS. 3 and 3B show an embodiment of the present invention having a general reference numeral 50 in which the transmission hologram grating 30 is used. The hologram grating 30 is constructed in such a way that a collimated elliptical beam 52 (in dash lines and also shown in FIG. 3B) from a laser 54 will become circular in the diffracted beam (in dash lines and also shown in FIG. 3C) indicated by arrows 56. The beam 56 from the laser 54 and the grating 30 are rotated 45 degrees so that the polarization of the beam 56 is at 45 degrees with respect to the plane of incidence on a prism 58 and then onto an objective lens 59. It is known that coated mirrors or prisms can cause phase retardation on the incident beam. Because of the prism 58, the polarization of the return beam from a recording medium 60 is rotated by 90 degrees from the original beam 56. As a result, most of the reflected beam is transmitted through the hologram grating 30 and focused by a toric lens 62 onto a light detector 64. The detector 64 is shown in FIG. 3A with four quad zones 1, 2, 3 and 4.

FIG. 4 illustrates another embodiment of the subject invention in which the reflection hologram grating 30 is used. The advantage of the hologram grating 30 in this example is that the toric lens 62 is bonded to one side of the grating 30 to eliminate the need of a support for the toric lens 62. FIG. 4A again shows zones 1, 2, 3 and 4 of the detector 64.

Figure 5B:
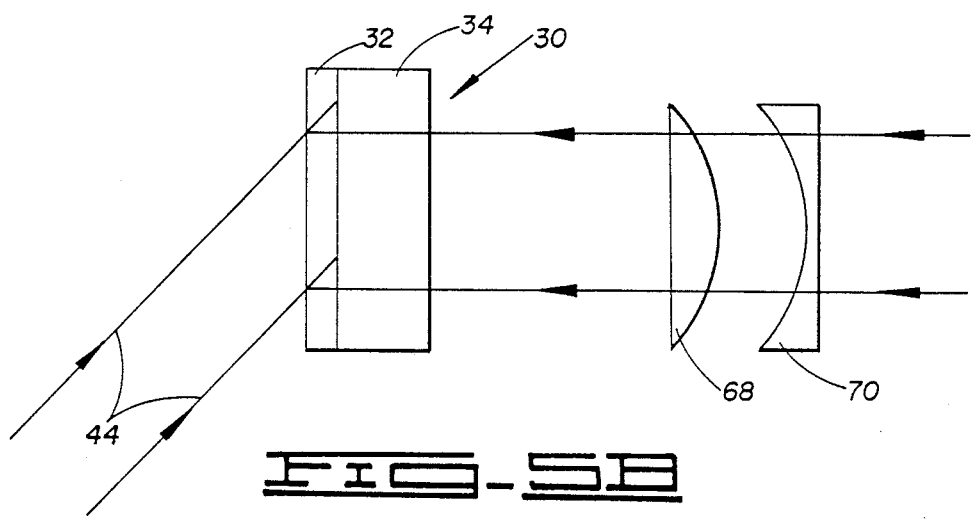

FIGS. 5A and 5B show the incorporation of a wave front of a cylindrical lens onto the hologram grating 30. The cylindrical wave front of a light beam 66 is produced by a negative cylindrical lens 70 on a positive cylindrical lens 68. The cylindrical wave front is used to compensate for astigmatism in many of the semiconductor laser diodes. The so-called astigmatic distance in laser diodes ranges from one micrometer to about 25 micrometers. It is difficult and costly to polish a glass cylindrical lens to correct this type of abberation. However, through the use of the hologram grating 30 the light source wave front can be easily and inexpensively corrected.

Changes may be made in the construction and arrangement of the parts or elements of the embodiments as described herein without departing from the spirit or scope of the invention defined in the following claims.

What is claimed is:

1. Light production and modification apparatus usable in an optical data recording device having a recording medium comprising:
   a laser light source for producing a collimated light beam having a first cross-sectional beam shape;
   first beam diffraction means positioned for receiving said collimated light beam from said laser light source and for diffracting said collimated light beam, said first means having a single planar holographic grating, said single planar holographic grating being operative to diffract said collimated light beam to produce a diffracted light beam having a second cross-sectional beam shape wherein said second cross-sectional beam shape is different from said first cross-sectional beam shape;
   second means, positioned to receive said diffracted light beam, for directing said diffracted light beam towards the recording medium for reflection therefrom to provide a reflected light beam, said second means being operative to change the polarization of at least one of said diffracted light beam and said reflected light beam, said reflected light beam impinging on said first means, and wherein said reflected light beam passes through said first means substantially perpendicular to the plane of said single planar holographic grating and substantially without change in direction during said passage;
   focusing means disposed between said second means and the recording medium for focusing said diffracted light beam on the recording medium.

2. Apparatus as described in claim 1 wherein the recording medium is a rotating optical disk.

3. Apparatus as described in claim 1 wherein said focusing means is an objective lens disposed between said second means and the recording medium.

4. Apparatus as described in claim 1 further including a toric lens disposed adjacent said first means for focusing said reflected light beam.

5. Apparatus, as claimed in claim 4, wherein said toric lens is bonded to said first means.

6. Light production, modification and detection apparatus usable in an optical data recording device having a recording medium comprising:
   a laser light source for producing a collimated light beam having a first cross-sectional beam shape;
   first beam diffraction means positioned for receiving said collimated light beam from said laser light source and for diffracting said collimated light beam, said first means having a single planar holographic grating, said single planar holographic grating being operative to diffract said collimated light beam to produce a diffracted light beam having a second cross-sectional beam shape wherein said second cross-sectional beam shape is different from said first cross-sectional beam shape;
   a prism positioned to receive said diffracted light beam;
   an objective lens positioned between said prism and the recording medium, said objective lens focusing said diffracted light beam on the recording medium for reflection therefrom to produce a reflected light beam, said reflected light beam impinging on said first means and wherein said reflected light beam passes through said first mean substantially perpendicular to the plane of said single planar holographic grating and substantially without change in direction during said passage;
   a light detector positioned to receive said reflected light beam from the recording medium, and;
   a toric lens between said first means and said light detector for focusing said reflected light beam on said light detector.

7. Apparatus as described in claim 6 wherein the recording medium is a rotating optical disk.

8. Light production and modification apparatus usable in an optical data recording device having a recording medium comprising:
   a laser light source for producing a collimated astigmatic light beam;
   first beam diffraction means positioned for receiving said collimated astigmatic light beam from said laser light source and for diffracting said collimated light beam, said first means having a single planar holographic grating, said single planar holographic grating being operative to diffract said collimated light beam to produce a diffracted light beam, said first means also being operative to change the wave front of said collimated astigmatic light beam to compensate said diffracted light beam for astigmatism;

second means, positioned to receive said diffracted light beam, for directing said diffracted light beam towards the recording medium for reflection therefrom to provide a reflected light beam, said reflected light beam impinging on said first means and wherein said reflected light beam passes through said first means substantially perpendicular to the plane of said single planar holographic grating and substantially without change in direction during said passage;

focusing means disposed between said second means and the recording medium for focusing said diffracted light beam on the recording medium.

* * * * *